US006468258B1

(12) United States Patent
Shang

(10) Patent No.: US 6,468,258 B1
(45) Date of Patent: Oct. 22, 2002

(54) PLASTIC COMPOSITIONS INCLUDING VITAMIN E FOR MEDICAL CONTAINERS AND METHODS FOR PROVIDING SUCH COMPOSITIONS AND CONTAINERS

(75) Inventor: Shaye-Wen Shang, Vernon Hills, IL (US)

(73) Assignee: Baxter International Inc., Deerfield, IL (US)

( * ) Notice: Subject to any disclaimer, the term of this patent is extended or adjusted under 35 U.S.C. 154(b) by 0 days.

(21) Appl. No.: 08/897,049

(22) Filed: Jul. 18, 1997

(51) Int. Cl.[7] .................. A61B 19/00; A61M 37/00; B32B 27/08
(52) U.S. Cl. .............. 604/408; 604/6.15; 128/DIG. 24; 428/35.7; 428/474.4
(58) Field of Search ...................... 422/44–46; 604/408, 604/403–410, 4–6; 106/218; 428/35.2, 35.5, 35.7, 474.4, 474.5, 474.8, 476.1–476.3; 525/66, 92 B; 383/105, 109, 42, 93, 94; 128/DIG. 24; 206/466, 766, 778, 828; 220/500, 62.11, 62.21, 62.22

(56) References Cited

U.S. PATENT DOCUMENTS

| | | |
|---|---|---|
| 4,507,387 A | 3/1985 | Gajewski et al. |
| 4,710,532 A | 12/1987 | Hull et al. |
| 4,711,922 A | 12/1987 | Hull et al. |
| 4,789,700 A | 12/1988 | Hull et al. |
| 4,824,893 A | 4/1989 | Hull |
| 4,870,204 A | 9/1989 | Hull et al. |
| 4,883,905 A | 11/1989 | Hull et al. |
| 4,892,967 A | 1/1990 | Hull et al. |

(List continued on next page.)

FOREIGN PATENT DOCUMENTS

| | | |
|---|---|---|
| EP | 0051414 A1 | 5/1982 |
| EP | 0138147 A2 | 4/1985 |
| EP | 419373 B1 | 11/1994 |
| WO | WO 90/07547 | 7/1990 |

OTHER PUBLICATIONS

Sai S. Young, et al., "A 'Phosphite–Free' System To Stabilize Polyolefins", *Polyolefins IX International Conference*, Feb. 26–Mar. 1, 1995, Houston, Texas.
S.F. Laermer and P.F. Zambetti, "Alpha–Tocopherol (Vitamin E)—The Natural Antioxidant For Polyolefins", *Journal of Plastic Film & Sheeting*, vol. 8, Jul. 1992.
Himont, "Experimental Analysis Report", E–035.
Himont, "Experimental Analysis Report", E–022R.
International Search Report for PCT/US98/12955, mailed Oct. 21, 1998.
Patent Abstracts of Japan, vol. 009, No. 260 (C–3 09) for Publication No. 60112847, Publication Date Jun. 19, 1985, Application No. 58220805, Application Date Nov. 25, 1983, "Vinylidene Chloride Resin Composition and its Manufacture", Oct. 17, 1985.
Chemical Abstracts, vol. 112, No. 2, Jan. 8, 1990, "Nontoxic Stabilized Vinyl Chloride Polymer Compositions for Transparent Packaging", XP002079914, Japan 01 170632 A (Sakai Chemical Insdustry, Co.).

*Primary Examiner*—Angela D. Sykes
*Assistant Examiner*—P M Bianco
(74) *Attorney, Agent, or Firm*—Andrew G. Kolomayets; Amy L. H. Rockwell

(57) ABSTRACT

Plastic compositions, medical containers and methods for providing such compositions and containers are disclosed. The plastic compositions and the medical containers made thereof include a plastic resin, Vitamin E and a plasticizer. The plastic resin may be polymeric material such as polyvinyl chloride or polyolefin.

48 Claims, 1 Drawing Sheet

U.S. PATENT DOCUMENTS

| | | |
|---|---|---|
| 4,931,583 A | 6/1990 | Hull et al. |
| 4,954,649 A | 9/1990 | Hull et al. |
| 5,026,347 A | 6/1991 | Patel |
| 5,037,419 A | 8/1991 | Valentine et al. |
| 5,100,401 A | 3/1992 | Patel |
| 5,122,418 A * | 6/1992 | Nakane et al. ............... 424/401 |
| 5,167,657 A | 12/1992 | Patel |
| 5,302,454 A | 4/1994 | Cecchin et al. |
| 5,382,526 A | 1/1995 | Gajewski et al. |
| 5,482,772 A | 1/1996 | Strack et al. |
| 5,487,971 A * | 1/1996 | Holme et al. ................... 435/2 |
| 5,500,397 A | 3/1996 | Cuffiani et al. |
| 5,539,057 A | 7/1996 | Giroux |
| 5,554,373 A * | 9/1996 | Seabrook et al. ........... 424/400 |
| 5,585,317 A | 12/1996 | Sacchetti et al. |
| 5,585,434 A | 12/1996 | DeNicola, Jr. et al. |
| 5,589,549 A | 12/1996 | Govoni et al. |
| 5,683,768 A | 11/1997 | Shang et al. |
| 5,814,697 A * | 9/1998 | Akao et al. ................. 524/495 |
| 5,952,423 A | 9/1999 | Shang et al. |

* cited by examiner

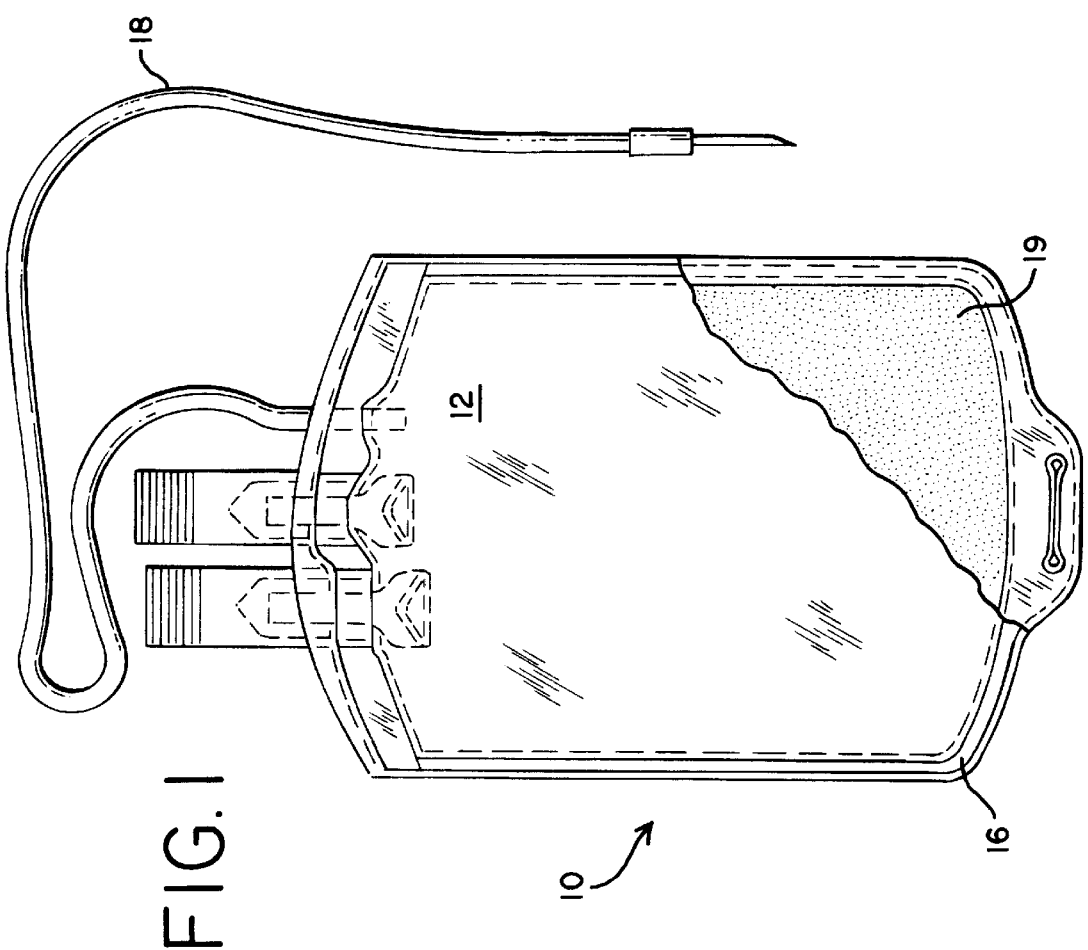
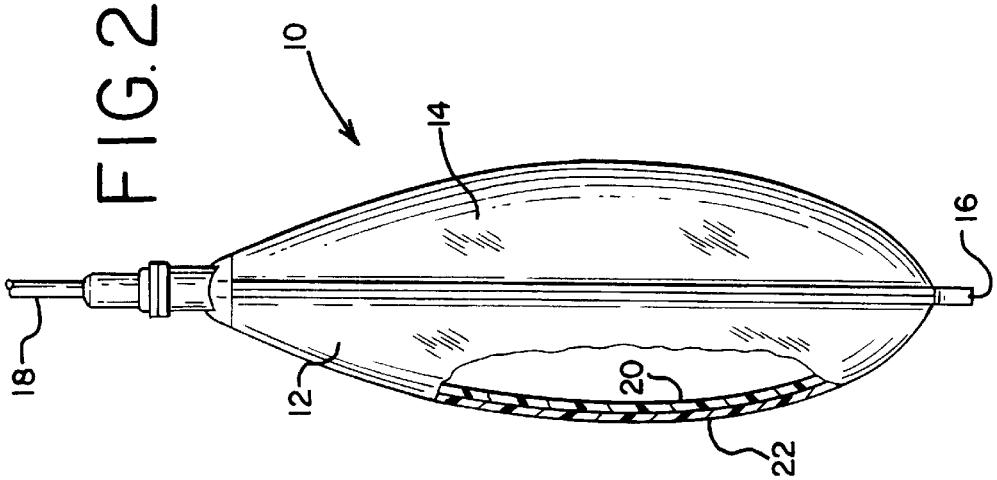

PLASTIC COMPOSITIONS INCLUDING VITAMIN E FOR MEDICAL CONTAINERS AND METHODS FOR PROVIDING SUCH COMPOSITIONS AND CONTAINERS

The present invention relates, in general, to plastic compositions and, in particular, to plastic compositions that may be used for medical containers, such as containers for the storage of blood and/or blood cells. The present invention also relates to methods for storing blood and/or blood cells in containers made from such compositions.

BACKGROUND

Whole blood is typically described as being made up of various cellular components such as red blood cells (RBCs), white blood cells (WBCs) and platelets, suspended in a liquid component, plasma. Each component plays a specific and important role in the human body. For example, platelets (together with clotting factors and other substances in the blood) are responsible for blood clotting. WBCs are primarily responsible for fighting disease. RBCs transport oxygen ($O_2$) and carbon dioxide ($CO_2$) to and from body tissues. The $O_2$ and $CO_2$ are carried by a protein called hemoglobin, which is found inside the RBC.

Blood and blood components are collected in a variety of ways. One of the most common blood collection techniques, and perhaps the most well known, is the manual collection of whole blood from healthy donors. This is usually performed at a local hospital, blood collection center or even a community center such as a local school or church as part of a blood collection drive. In the manual technique, a needle is inserted into the donor's arm and blood is withdrawn from the donor through the needle and associated tubing. The withdrawn whole blood is collected in a sterile plastic collection container or pouch attached to the other end of the tubing. The collected "unit" of whole blood may then be transfused into a patient.

Alternatively, rather than transfusing an entire unit of whole blood, the collected whole blood may be separated into its various components, and the desired component may be transfused to a patient in need of that particular component. For example, separated RBCs may be administered to patients who have experienced rapid blood loss, or to improve the oxygen carrying capability of blood in patients suffering from anemia and the like. Platelets may be administered, for example, to cancer patients whose ability to produce platelets has been destroyed by chemotherapy and/or radiation treatment. Thus, separation of whole blood into individual components to be used as needed in different patients, results in more efficient usage of the available blood supply.

Briefly, manually collected whole blood may be separated into its components by first centrifuging the bag of collected whole blood to separate RBCs from the remaining components. Rotation of the centrifuge imparts a centrifugal force on the whole blood and causes the components of whole blood to sediment into layers or bands based on the densities of the components. Thus, the more dense (or "heavier") components, such RBCs, are separated from the lighter components such as platelets and plasma. For example, centrifugation forces the RBCs to the bottom of the collection container, leaving most of the less dense platelets and plasma in a layer above the RBCs. The layers of blood components may be segregated from each other by either allowing the RBCs to drain out of the collection container and into a separate container, or by squeezing the collection container to express the remaining components (e.g. platelets and plasma) to a separate container. If additional separation of the platelets from plasma is desired, the remaining platelets and plasma may be centrifuged in similar fashion to provide "platelet-poor plasma" and platelet concentrate.

As an alternative to manual collection, whole blood may be separated and its components collected in an "automated" procedure or system. Automated blood collection systems or instruments typically include a separation device, such as a centrifuge, pumps and an associated disposable tubing set for moving blood, blood components and other fluids from the donor, to the centrifuge device and back to the donor. The disposable tubing set may also include containers which are placed inside the centrifuge device and where the blood is separated into its components. Examples of automated blood separation and collection instruments are the CS3000® Plus Blood Cell Separator and the Amicus™ Separator, both made by Baxter Healthcare Corporation of Deerfield, Ill.

In an automated system, a needle (which is attached to tubing of the disposable tubing set) is inserted into the arm of the donor. Whole blood is then continuously or intermittently withdrawn from the donor and introduced into the separation container inside the rotating centrifuge where, under the influence of the centrifugal force (as described above), the desired components are separated from the undesired components. The desired component is collected in a collection container, while the undesired components may be returned (for example, by pumping) to the donor. The collected component may be transferred to a separate container for storage or, alternatively, may be stored in the collection container.

The containers for collection and/or storage of blood and blood components should be flexible, sterilizable and suitable for storage (and often extended storage) of blood and blood components. They are typically made of a plastic composition, two sheets of which are sealed together (in a facing arrangement) along their peripheries. Prior to introduction of the blood component, the container is sterilized by steam, gas or radiation sterilization. Like the disposable tubing sets described above, the containers are typically intended for one-time use and are disposed of after such use.

The plastic composition used in such containers typically includes a plastic resin that is suitable for contact with blood, such as polyvinyl chloride, polyolefin or polyester. The plastic composition may also include additives, for example, to stabilize the plastic composition during processing or during sterilization of the container, which may, at times, be carried out at high temperatures.

Unfortunately, exposure of certain plastic compositions to high temperatures, such as during extrusion of the plastic composition and/or during steam sterilization, may occasionally cause degradation of the plastic composition. Degradation, which is believed to be associated with a molecular breakdown of the polymer resins and other materials, may result in a weakening of the overall mechanical strength of the container. More particularly, degradation may result in a weakening of the peripheral seals and a reduction in the impact strength (i.e. ability of the container to withstand impact). Moreover, exposure to heat and/or even extended exposure to less severe environments may also cause undesirable and aesthetically unacceptable discoloration (e.g. yellowing) of the plastic material.

To prevent or reduce degradation and/or discoloration, inclusion of a small amount of certain additives can help stabilize the plastic material during high temperature heating and during exposure to certain other environments. As reported in U.S. Pat. No. 4,280,497, which is incorporated by reference herein, epoxodized oils, such as epodoxidized soy been oil and epoxodized linseed oil may be used as heat stabilizers. Also, as reported in Laermer et al. "Use of Biological Antioxidants as Propylene stabilizers", *Plastics and Rubber Processing and Applicants* 14 (1990) 235–239 and Laermer et al. "Alpha-Tocopherol (Vitamin E)—The Natural Antioxidant for Polyolefins "*Journal of Plastic Film and Sheeting*, Vol. 8, July 1992 (both of which are also incorporated by reference), Vitamin E (which is a mixture of tocopherols and tocotrienols) is an antioxidant that can serve as a stabilizer during extrusion of polyolefins. Vitamin E as an antioxidant is preferred because, as reported in the 1992 article by Laermer, it is non-toxic and is "generally regarded as safe" (GRAS) by the FDA.

Additives may also be combined with the plastic resin to enhance the storage of the blood and/or blood components. For example, a concern during the storage of platelets is the tendency of platelets to stick together and form platelet aggregates, which makes the platelets less suitable for transfusion to a patient. A concern during the storage of RBCs is that the membrane surrounding the RBC cell may rupture. The rupturing of the RBC membrane is commonly referred to as "hemolysis". The hemolysis of RBCs results in the release of hemoglobin, thus, impairing the RBC's ability to transport $O_2$ and $CO_2$. These RBCs are less suitable for transfusion to a patient.

It has been observed that certain additives, such as Vitamin E may suppress hemolysis in red blood cells. As reported in U.S. Pat. No. 5,037,419, Vitamin E added directly to red blood cells, results in lower hemolysis. In addition, certain plasticizers (originally and still used as softeners for polyvinyl chloride), appear to have a beneficial effect on the viability of stored blood and/or red blood cells. It has been observed that red blood cells stored in plastic containers that include certain plasticizers experience a lower rate of hemolysis than RBCs stored in containers free of plasticizers. Thus, even for those materials that are not as rigid as PVC and are otherwise suitable for use in the storage of blood, including a sufficient amount of an additive, such as a plasticizer, may reduce the rate of hemolysis in the stored blood.

Several different plasticizers are suitable for use with PVC and non-PVC resins. For example, plasticizers from the family of phthalate esters, and in particular, di-2-ethylhexylphthalate (DEHP) have been used in combination with PVC resins. In addition, tri(2-ethylhexyl)trimellitate (TEHTM) has also been used with PVC resins. More recently, citrate esters have been used to plasticize PVC. PVC plasticized with citrate ester is described, for example, in U.S. Pat. Nos. 4,710,532, 4,789,700, 4,870,204, 4,883,905, 4,892,967, 4,931,583, 4,711,922 and 4,954,649, all of which are incorporated by reference herein. Non-PVC resins with citrate ester or TEHTM are described in U.S. Pat. Nos. 5,026,347, 5,100,401 and 5,167,657, all of which are assigned to the assignee of the present application and are incorporated by reference herein.

Of the above-identified plasticizers, the citrate esters and, in particular, n-butyryltri-n-hexyl citrate (sometimes abbreviated as BTHC) may be preferred because of the perceived ability of the human body to more easily metabolize citrate ester than, for example, DEHP. In addition, it is believed that, in certain circumstances, citrate esters may provide improved suppression of hemolysis as compared to DEHP and other plasticizers. However, BTHC is more expensive than TEHTM and DEHP and inclusion of BTHC increases the cost of making the container.

Blood storage containers which include some or all of the above identified resins and additives are disclosed in several patents. For example, the aforementioned U.S. Pat. No. 4,280,497 discloses a container for platelet storage that includes PVC, TEHTM plasticizer and epoxodized oils for heat stabilization. U.S. Pat. No. 5,037,419 discloses a plasticizer-free blood storage container made of a plastic material (such as polyester or polyolefin) where vitamin E is added to the stored blood so as to reduce hemolysis. U.S. Pat. No. 5,037,419 also contemplates, but does not describe in any detail, incorporating the Vitamin E into the plastic material directly.

The containers disclosed in the above-identified patents and elsewhere may work satisfactorily for storage of blood and/or some blood cells. Nonetheless, efforts to provide alternative formulations of resins and additives which, when combined, result in plastic compositions that are suitable for manufacture into blood storage containers have continued. It is desirable that such containers be capable of withstanding exposure to high temperatures and other environments without significant degradation and/or discoloration. It is also desirable that such containers be capable of enhancing the storage of blood or certain blood components by, for example, suppressing the rate of hemolysis in stored RBCs or reduce aggregation in stored platelets. As the blood storage containers are disposable and intended for one-time use, it is also desirable that such containers provide the above-described benefits at a relatively low cost.

SUMMARY OF THE CLAIMED INVENTIONS

There are several different aspects to the present invention which may be employed together or separately without departing from the present invention.

For example, the present invention is directed, in part, to a plastic composition that includes a plastic resin, Vitamin E and plasticizer. In one aspect of the present invention, the plastic resin may be polyvinyl chloride ("PVC"), while in another aspect of the present invention, the plastic resin may be a non-PVC such as polyolefin.

In another aspect, the present invention is directed to a plastic container made from a plastic composition that includes a plastic resin, Vitamin E and a plasticizer. In one aspect of the present invention, the plastic resin may be polyvinyl chloride while in another aspect of the present invention, the plastic resin may be a non-PVC resin such as polyolefin.

In another aspect, the present invention is directed to a method for storing blood cells. The method includes providing a container made of a plastic composition. The plastic composition includes a resin, Vitamin E and a plasticizer. The method includes introducing blood cells into the container and storing the blood cells therein.

BRIEF DESCRIPTION OF THE DRAWINGS

FIG. 1 is a plan view of a medical container, with a portion broken away, depicting one embodiment of the present invention; and FIG. 2 is a side view of a medical container with a portion broken away, depicting an alternative embodiment of the present invention.

DETAILED DESCRIPTION OF THE DISCLOSED EMBODIMENTS

The following detailed description is not intended to set forth all possible variations or applications of the present invention. For this reason, the scope of the invention is not defined by or limited to the embodiments described below, but by the appended claims. Accordingly, the present invention includes future variations or embodiments not presently appreciated by the inventor, but that would be apparent to persons of ordinary skill upon reading this description.

Turning now to the figures, FIG. 1 shows a plastic container 10 made in accordance with the present invention. Container 10 includes facing flat walls 12 and 14 made of flexible, plastic sheets sealed together at their periphery 16 in a manner known to those skilled in the art, such as heat sealing and sonic welding. Other techniques for providing a container, which does not require sealing of sheets, such as blow molding may also be used. Of course, the present invention is not limited to how the container is formed. Container 10 may also include at least one blood collection tube 18.

In one embodiment of the present invention, walls 12 and 14 may be made entirely of the plastic composition of the present invention. Alternatively, only the interior surface 19 (the side of the wall that would be in contact with the blood during storage) or even a portion of the interior surface 19 of walls 12 and 14 may be made of the plastic composition of the present invention. Container walls 12 and 14 may be made of a single layer of the plastic composition or, alternatively, as shown in FIG. 2, container walls 12 and 14 may be made of two or more layers 20 and 22 laminated together wherein at least the inner layer 20 or a portion of inner layer 20 is made of the plastic composition of the present invention.

The plastic resin employed in the present invention may be any flexible plastic material that is suitable for use in the extended storage of red blood cells and platelets and is, preferably, steam sterilizable. Preferably, the plastic resin may be a polymeric material such as polyvinyl chloride, polyolefin or polyester.

Thus, in one embodiment, the plastic resin is polyvinyl chloride, which is commonly used as a material for medical containers. Polyvinyl chloride is available from several different sources, including the Geon Corporation of Avon, Ohio.

In another embodiment, the plastic resin may be polyolefin or a copolymer thereof. The polyolefins and polyolefin copolymers should be suitable for mixing and compounding with plasticizer, and capable of adsorbing plasticizer and retaining the plasticizer during steam sterilization or other high temperature heating.

Although many different polyolefins and copolymers thereof are compatible with plasticizers and are able to adsorb the plasticizer, certain polyolefins prepared by certain polymerization processes (and utilizing certain catalysts for such polymerization) may be better suited for use in plastic compositions of the present invention. For example, as described in U.S. Pat. No. 5,952,423 and incorporated by reference herein, polyolefins prepared by the so called "Catalloy" process provide polyolefin copolymers that are capable of adsorbing and retaining most of the original plasticizer even after steam sterilization. The "Catalloy" process is described generally in U.S. Pat. No. 5,302,454 which is incorporated by reference herein. As set forth in U.S. Pat. No. 5,302,454, the Catalloy polymerization process includes at least two stages. In the first stage, polypropylene is polymerized to form a polypropylene backbone (which can be a homopolymer of polypropylene) and, in the following stages ethylene-propylene and possibly butadiene (or butene) are polymerized and added to the polypropylene.

The Catalloy process results in spherical particles having a certain porosity and density which, it is believed, makes them effective in adsorbing plasticizers and retaining the plasticizer during steam sterilization at about 120° C. for at least 60 minutes. Examples of such polyolefin copolymers are the thermoplastic olefins (which are polyolefin copolymers of polypropylene, ethylene and butene) KS-050, KS-052P, KS-059P, KS-051P, KS-080 all available from Montell Technology Company BV, Hoofddorp, The Netherlands.

In addition to the polyolefins obtained by the Catalloy process, the "Spheripol" and "Spherilene" processes also provide polyolefin copolymers having characteristics similar to the "Catalloy" polyolefin copolymers. Examples of such polyolefin copolymers are copolymers of polypropylene such as SA-849S, also available from Montell Technology Company BV. Moreover, the plastic resin may include two or more polyolefin copolymers prepared by the Catalloy, Spheripol and Spherilene processes. Of course, the polyolefin copolymer is not limited to polyolefin copolymers prepared by the above-described processes and any other polymers, copolymers or combinations of two or more polymers or copolymers (such as polyolefin and copolymers thereof) that are capable of adsorbing and retaining plasticizer after sterilization may be used.

The plastic composition of the present invention includes Vitamin E. As reported in U.S. Pat. No. 5,037,419, (incorporated by reference herein), Vitamin E is capable of suppressing the hemolysis of blood cells. Also, as reported in Laermer et al. "Use of Biological Antioxidants as Propylene stabilizers", *Plastics and Rubber Processing and Applicants* 14 (1990) 235–239 and Laermer et al. "Alpha-Tocopherol (Vitamin E)—The natural Antioxidant for Polyolefins "*Journal of Plastic Film and Sheeting*, Vol. 8, July 1992 (both of which are also incorporated by reference), Vitamin E (which is a mixture of tocopherols and tocotrienols) is an antioxidant that can serve as a stabilizer during extrusion of polyolefins. Vitamin E as an antioxidant is preferred because, as reported in the 1992 article by Laermer, it is non-toxic and "generally regarded as safe" (GRAS) by the FDA. In accordance with one aspect of the present invention, the Vitamin E is blended with the plastic resin and is a component of the plastic composition. It is believed that the Vitamin E prevents the formation of free radicals, which may form during exposure of the plastic composition to high temperature heating. It is also believed that the Vitamin E in the plastic composition will interact with the stored red blood cells and suppress the rate of hemolysis. In addition, it is also believed that the stabilizing effect of Vitamin E may help prevent platelet aggregation. Vitamin E is available from several suppliers including Hoffman-La Roche Corporation of Nutley, N.J.

The plastic resins and Vitamin E described above are further combined with a suitable plasticizer. Plasticizers capable of being combined with the polyolefin copolymers described above include, but are not limited to, DEHP, TEHTM and, preferably, citrate esters. Of course, other known materials capable of suppressing hemolysis may also be used. Preferably citrate esters of the formula

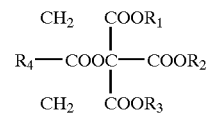

where: $R_1$, $R_2$ and $R_3 = CH_3$ to $C_{18}H_{37}$ and $R_4 = CH_3$ to $C_7H_{15}$ may be combined with the polyolefin copolymers described above. For example, citrate esters such as acetyltri-n-hexyl citrate, n-butyryltri-n-hexyl citrate, acetyltri-n-(hexyl/octyl/decyl/citrate or acetyltri-n-(octyl/decyl) citrate are suitable and butyryltri-n-hexyl citrate (sometimes abbreviated as BTHC) is preferred. Such citrate esters are described in U.S. Pat. Nos. 4,710,532, 4,789,700, 4,870,204, 4,883,905, 4,892,967, 4,824,893, 4,931,583, 4,711,922 and 4,954,649 and are available from the Morflex Chemical Co. of Greensboro, N.C. TEHTM is available, for example, from Hatco Chemical Corporation of Fords, N.J.

Thus, it is contemplated that some or all of the compounds such as Vitamin E, citrate ester, TEHTM may be combined with the plastic resins described above to provide a plastic composition that is capable of withstanding the high temperatures of processing and sterilizing without significant degradation and/or discoloration, but still retaining enough Vitamin E and plasticizer to suppress the hemolysis of the stored RBCs. For example, in one embodiment, Vitamin E and BTHC may be combined with the plastic resin. In another embodiment, the amount of BTHC can be reduced and a second plasticizer, such as TEHTM, may be included. In another embodiment, the amount of Vitamin E may also be reduced by adding a secondary stabilizer such as epoxodized oil. Of course, other combinations of the plasticizers, stabilizers and plastic resins are also conceivably within the scope of the present invention.

In addition to the additives described above, other compounds may be included in the plastic composition of the present invention. For example, where the plastic resin is a polyolefin copolymer such as the polyolefin copolymers described above, it may be desirable to include an additional polyolefin copolymer having a lower modulus so as to impart still greater flexibility to the plastic composition, to enhance the impact strength of the plastic composition and/or to improve the bonding and compatibility between the various compounds of the plastic composition. Thus the plastic composition may include polyolefin copolymers such as block copolymers. For example, block copolymers of ethylene and butylene with terminal blocks of styrene may be included. As set forth in U.S. patent application Ser. No. 08/360,913, filed Dec. 21, 1994 entitled "Plastic Formulations For Platelet Storage Containers And The Like", which is assigned to the assignee of the present application and incorporated by reference herein, the block copolymers may either be "functionalized" (i.e. containing a functional group of, for example, maleic anhydride) or "non-functionalized". Such polyolefin copolymers are available under the name Kraton from the Shell Chemical Co. Particularly well suited for inclusion in such a plastic composition are Kraton G-1924X and Kraton K-1660. Other suitable block copolymers are Septon 2007, 2063, 4033, 8007, 8006, 1001, 2002, 2007, 2043, 2063, 2006, 2104, 4033 and 4055 available from Kuraray Corporation of Tokyo, Japan.

In addition, the plastic composition may also include a selected amount of a polyamide (such as nylon). It is believed that inclusion of polyamide such as nylon makes the container more suitable for sealing by radio frequency (RF) energy. Polyamides are particularly applicable in formulations where the plastic resin is a polyolefin copolymer such as the polyolefin copolymers described above. Polyamides are available from many different manufacturers and one particular polyamide that may be used with the plastic composition of the present invention is TPX-159 available from the Henkel Corporation of Kankakee, Ill.

Finally, the plastic composition may further include additional materials such as secondary stabilizers and lubricants. Examples of additional stabilizers are the epoxodized oils such as Epoxol 9-5 available from American Chemical Service (ACS) of Griffith, Indiana and CZ-11 or Zinc-18 available from Akzo of Chicago, Ill. A suitable lubricant such as Acrawax available from Lonza of Fairlawn, N.J. may also be included. CZ-11 and Acrawax are particularly applicable in formulations where the plastic resin is polyvinyl chloride.

Some or all of the above described compounds may be included in the plastic composition of the present invention. For example, the plastic composition may include anywhere between approximately 30–98%, by weight, of the plastic resin. The plastic composition may include between 1–40%, by weight, of Vitamin E and between 1–30%, by weight, of plasticizer such as a citrate ester and, more specially, n-butyryltri-n-hexyl citrate. In addition, and particularly where the plastic resin is a polyolefin copolymer, between 0–15%, by weight, of polyamide, and/or 0–30%, by weight of one or more block copolymers, may also be included. Finally, if desired, 0–10%, by weight of TEHTM and/or 0–15%, by weight of other antioxidants such as epoxodized oil may also be included.

In one embodiment, the plastic composition may include between approximately 40–80% PVC, between approximately 1–40% Vitamin E, between approximately 1–30% of citrate ester, such as n-butyryltri-n-hexyl citrate, between approximately 1–40% TEHTM and between 0–15% of epoxodized oil. The plastic composition may also include less then 1% of lubricants and/or waxes. Additional formulations of PVC-based compositions are set forth in Table 1. The values set forth in Table 1 are percentages, by weight, of the plastic composition.

In another embodiment, the plastic composition may include between approximately 40–90% by weight of a first polyolefin copolymer, such as a Catalloy polyolefin copolymer, between approximately 1–40% Vitamin E, between approximately 1–15% of n-butyryltri-n-hexyl citrate, between approximately 5–20% of a first block copolymer and between approximately 0–20% of a second block copolymer, between approximately 5–25% of a polyamide, between approximately 0–15% TEHTM, between approximately 0–15% of epoxodized oil. Additional formulations of polyolefin—based compositions are set forth in Table 2. The values set forth in Table 2 are percentages, by weight, of the plastic composition.

TABLE 1

| | | PVC FORMULATION | | | | | | | |
|---|---|---|---|---|---|---|---|---|---|
| Formulation (PHR) | Supplier | 1 % | 2 % | 3 % | 4 % | 5 % | 6 % | 7 % | 8 % |
| PVC | Geon | 59 | 59 | 59 | 59 | 59 | 59 | 59 | 59 |
| Vitamin E | La Roche | 18 | 18 | 12 | 12 | 6 | 6 | 3 | 3 |
| BTHC | Morflex | 15 | 6 | 12 | 6 | 12 | 6 | 12 | 6 |

TABLE 1-continued

PVC FORMULATION

| Formulation (PHR) | Supplier | 1 % | 2 % | 3 % | 4 % | 5 % | 6 % | 7 % | 8 % |
|---|---|---|---|---|---|---|---|---|---|
| TEHTM | Hatco | 9 | 15 | 9 | 15 | 15 | 20 | 18 | 23 |
| Epoxol 9-5 | ACS | 3 | 3 | 9 | 9 | 9 | 9 | 9 | 9 |
| CZ-11 | Akzo | 0.1 | 0.1 | 0.1 | 0.1 | 0.1 | 0.1 | 0.1 | 0.1 |
| Acrawax | Lonza | 0.1 | 0.1 | 0.1 | 0.1 | 0.1 | 0.1 | 0.1 | 0.1 |

TABLE 2

POLYOLEFIN BASED FORMULATION

| Formulation (PHR) | Supplier | 1 % | 2 % | 3 % | 4 % | 5 % | 6 % | 7 % | 8 % |
|---|---|---|---|---|---|---|---|---|---|
| KS-050 | Montell | 50 | 50 | 50 | 50 | 50 | 50 | 50 | 50 |
| G-1924X | Shell | 10 | 10 | 10 | 10 | 10 | 10 | 10 | 10 |
| K-1660 | Shell | 10 | 10 | 10 | 10 | | | | |
| TPX-159 | Henkel | 10 | 10 | 10 | 10 | 10 | 10 | 10 | 10 |
| Vitamin E | La Roche | 5 | 5 | 10 | 10 | 15 | 15 | 20 | 20 |
| BTHC | Morflex | 5 | 5 | 5 | 5 | 5 | 5 | 5 | 5 |
| TEHTM | Hatco | 5 | | 5 | | 5 | | 5 | |
| Epoxol 9-5 | ACS | 5 | 10 | | 5 | 5 | 10 | | 5 |

Medical containers made in accordance with the present invention may be prepared by mixing the above described components in approximately the above described amounts in a large scale mixer. The polyolefin copolymers, Vitamin E and plasticizer are mixed for anywhere between 1 to 30 minutes and, most typically, approximately 5 minutes. Alternatively, the Vitamin E and plasticizer may be premixed to form a Vitamin E/plasticizer blend. Other components described above may be added and the composition may be extruded in ways that are known to those skilled in the art to form small pellets. The pellets may be further blended and/or formed into plastic sheets, typically ranging in thickness between 5 and 20 mils and, preferably, 5 to 15 mils. The plastic sheets are then brought together in a face to face relationship, shaped into containers, inserted with tubing ports (which may be made of the plastic composition or any other steam sterilizable plastic composition) in ways that are known to those of skill in the art. The sheets of formed plastic material are then sealed by, for example, RF sealing and sterilized by steam or other form of sterilization.

The above description is intended for illustrative purposes only and is not intended to limit the present invention to any one of the embodiments described above. The true scope of the present invention is defined by the claims set forth below.

That which is claimed:

1. An autoclavable, flexible, plastic container comprising two sealed-together, facing walls capable of being RF sealed, wherein at least a portion of the interior of at least one of said walls is made of a plastic composition comprising:
   a resin;
   at least one plasticizer; and
   an amount of Vitamin E effective to (a) stabilize said composition during manufacture of said container and (b) reduce the rate of hemolysis of red blood cells stored therein.

2. The container of claim 1 wherein said composition further comprises at least one block copolymer.

3. The container of claim 2 wherein said composition comprises a functionalized block copolymer and a non-functionalized block copolymer.

4. The container of claim 2 wherein said composition further comprises up to approximately 20% by weight of a second block copolymer.

5. The container of claim 1 wherein said composition further comprises an additional plasticizer.

6. The container of claim 5 wherein said one plasticizer comprises a citrate ester and said additional plasticizer comprises tri(2-ethylhexyl)trimellitate.

7. The container of claim 1 wherein said composition further comprises a polyamide.

8. The container of claim 1 wherein said resin comprises a polyolefin copolymer capable of adsorbing and retaining most of said plasticizer after steam sterilization.

9. The container of claim 1 wherein said composition comprises, by weight:
   between approximately 40–90% by weight of a polyolefin copolymer;
   between approximately 1 and 40% Vitamin E;
   between approximately 1 and 15% of a citrate ester;
   between approximately 5–20% of a block copolymer; and
   between approximately 5–25% of a polyamide.

10. A plastic composition suitable for contact with a biological fluid intended for infusion into a patient comprising:
    approximately 30–98%, by weight, of a resin;
    approximately 1–40%, by weight, Vitamin E; and
    approximately 1–30%, by weight, of at least one plasticizer.

11. The plastic composition of claim 1 wherein said resin comprises polyvinyl chloride.

12. The plastic composition of claim 11 comprising a plasticizer selected from the group consisting of citrate ester, tri(2-ethylhexyl)trimellitate and di-2-ethylhexylphthalate.

13. The plastic composition of claim 12 wherein said plasticizer is n-butyryltri-n-hexyl citrate.

14. The plastic composition of claim 13 wherein said composition further comprises tri(2-ethylhexyl)trimellitate.

15. The plastic composition of claim 11 comprising:
    between approximately 40–80% polyvinyl chloride;
    between approximately 1–40% Vitamin E:
    between approximately 1–30% citrate ester;
    between approximately 1–40% tri(2-ethylhexyl)trimellitate; and
    between approximately 0–15% epoxidized oil.

16. The plastic composition of claim 10 wherein said resin comprises a non-PVC material.

17. The plastic composition of claim 10 wherein said resin comprises a polyolefin.

18. The plastic composition of claim 17 comprising:
    a first polyolefin copolymer;
    a second polyolefin copolymer;
    a polyamide;

at least one plasticizer; and

Vitamin E.

19. The plastic composition of claim 18 wherein said first polyolefin copolymer is prepared by Catalloy polymerization.

20. The plastic composition of claim 11 comprising a citrate ester plasticizer and tri(2-ethylhexyl)trimellitate.

21. The plastic composition of claim 17 comprising a polyolefin copolymer.

22. The plastic composition of claim 21 comprising a copolymer of propylene and ethylene.

23. The plastic composition of claim 17 further comprising a second polyolefin copolymer.

24. The composition of claim 1 comprising, by weight:

between approximately 40–90% of a polyolefin copolymer;

between approximately 1 and 40% of Vitamin E;

between approximately 1 and 15% of a citrate ester;

between approximately 5–20% of a block copolymer; and between approximately 5–25% of a polyamide.

25. The composition of claim 24 further comprising up to approximately 20% by weight of a second block copolymer.

26. The composition of claim 24 further comprising up to approximately 15% by weight of tri (2-ethylhexyl) trimellitate.

27. The composition of claim 24 further comprising up to approximately 15% by weight of epoxodized oil.

28. The plastic composition of claim 1 wherein said biological fluid includes a component of blood.

29. A medical container for holding a biological fluid intended for infusion into a patient, said container comprising two facing walls, wherein at least a portion of the interior of at least one of said walls is made of a plastic composition comprising:

approximately 30–98%, by weight, of a resin;

approximately 1–40%, by weight, Vitamin E; and approximately 1–30%, by weight of at least one plasticizer.

30. The container of claim 29 wherein said resin comprises polyvinyl chloride.

31. The container of claim 30 wherein said plasticizer comprises a citrate ester.

32. The container of claim 31 wherein said citrate ester is n-butyryl-tri-n-hexyl citrate.

33. The container of claim 32 wherein said composition further comprises tri(2-ethylhexyl)trimellitate.

34. The container of claim 30 wherein said composition comprises:

between approximately 40–80% polyvinyl chloride;

between approximately 1–40% Vitamin E:

between approximately 1–30% citrate ester;

between approximately 1–40% tri (2-ethylhexyl) trimellitate; and between approximately 0–15% epoxodized oil.

35. The container of claim 29 wherein said resin comprises a non-PVC material.

36. The container of claim 29 wherein said resin comprises a polyolefin.

37. The container of claim 36 wherein said composition comprises a first polyolefin copolymer.

38. The container of claim 36 wherein said composition comprises a copolymer of propylene and ethylene.

39. The container of claim 36 wherein said composition further comprises a second polyolefin copolymer.

40. The container of claim 37 wherein said composition comprises a citrate ester plasticizer and tri(2-ethylhexyl) trimellitate.

41. The container of claim 37 wherein said composition further comprises a blend of Vitamin E, n-butyryl-tri-n-hexyl citrate, tri(2-ethylhexyl)trimellitate and epoxodized oil.

42. The container of claim 36 wherein said composition comprises:

a first polyolefin copolymer;

a second polyolefin copolymer;

a polyamide;

at least one plasticizer; and

Vitamin E.

43. The container of claim 42 wherein said first polyolefin copolymer is prepared by Catalloy polymerization.

44. The container of claim 29 wherein said composition comprises, by weight:

between approximately 40–90% by weight of a polyolefin copolymer;

between approximately 1 and 40% Vitamin E;

between approximately 1 and 15% of a citrate ester;

between approximately 5–20% of a block copolymer; and between approximately 5–25% of a polyamide.

45. The container of claim 44 wherein said composition further comprises up to approximately 20% by weight of a second block copolymer.

46. The container of claim 44 wherein said composition further comprises up to approximately 15% by weight of TEHTM.

47. The container of claim 44 wherein said composition further comprises up to approximately 15% by weight of epoxodized oil.

48. The container of claim 29 wherein said biological fluid includes a component of blood.

* * * * *